Patented Dec. 1, 1931

1,834,490

UNITED STATES PATENT OFFICE

ROGER B. HILL, OF BERLIN, NEW HAMPSHIRE, ASSIGNOR TO BROWN COMPANY, OF BERLIN, NEW HAMPSHIRE, A CORPORATION OF MAINE

CONDITIONING OF ALKALI-PRESERVED LATEX AND CONDITIONED PRODUCT

No Drawing. Application filed June 7, 1929. Serial No. 369,267.

This invention relates to the conditioning of alkali-preserved latex more particularly for use as the impregnating agent in association with porous foundations for instance of a fibrous character. It further relates to the conditioned latex.

The natural latex of commerce usually contains an added alkali such as ammonia, which serves to keep the latex from undergoing putrefaction and coagulation during transit and storage. Caustic soda or caustic potash is generally used as a preservative in the case of rubber latices which have been concentrated by the evaporation of water to a solids content higher than that of the natural product. The usual ammonia-preserved latex has a solids content of about 33% to 37%, this content including various non-rubber constituents such as resins, proteins, sugars, and mineral salts to the extent of about 3% to 10%, depending upon the source of the latex. Some investigators have advanced the theory that the rubber globule in latex consists of a rubber-hydrocarbon core enveloped by a protein film. In accordance with this theory, the ammonia or other alkali used as a preservative evidently keeps the protein films from putrefaction and rupture, and accordingly prevents the rubber particles from coalescing and coagulating.

The latex of commerce is sometimes used as such for the impregnation of porous materials, to impart water resistance and other desirable qualities thereto. For instance, it is sometimes the practice to use rubber latex for the impregnation of fibrous material in the form of yarns or cords, textile fabrics, and interfelted webs, and then to dry the impregnated material to cause a setting or coagulation of the rubber therein. Interfelted webs of cellulose fiber, when so impregnated, dried, and vulcanized if desired, acquire many of the characteristics associated with natural leather, including water resistance, tear resistance, strength, and pliability. This is particularly true when the web is made by loosely felting cellulose fiber, preferably refined wood pulp of high alpha cellulose content, or cotton fiber, on machinery of the papermaking type, with little if any compacting during any stage of its formation or drying, as in such case the resulting web is of high porosity and may be quickly and uniformly penetrated by latex. When the dried, rubber-impregnated web contains 40% to 50%, or even more, rubber, it is still porous, has marked resiliency, and is admirably adapted for use in the manufacture of inner soles, where porosity, in addition to other leather-like qualities, is desired.

In manufacturing rubber-impregnated products as hereinbefore described, it is found that the finished product sometimes has a tacky feel, probably as a result of the resin content of the latex, and further that the rubber is non-uniformly distributed through the product. Apparently, setting or coagulation of the rubber by drying is so retarded by the natural anti-coagulants or proteins present in the latex that there is a tendency for rubber particles to migrate to the surface of the impregnated product, where evaporation of water is taking place. The tendency for migration of rubber particles is especially pronounced in the case of highly porous webs of cellulose fiber of the type described, evidently because of the high capillary action taking place during drying to cause such migration.

I have found that when an alkali-preserved latex, e. g., an ammonia-preserved latex, is treated with the oxide of an amphoteric metal, preferably zinc oxide, certain of the objectionable non-rubber constituents present in latex are converted to unobjectionable reaction products without coagulating the rubber, and that greatly improved results are obtained when the latex is used for impregnation purposes. Thus, it was found that when latex so treated was used for the impregnation of a bibulous web of interfelted fiber, the dried, rubber-impregnated web had a dry, leather-like feel and was of much greater uniformity in respect of rubber distribution therethrough. Inasmuch as zinc oxide is a desirable rubber-compounding or loading material, the zinc oxide not only favorably modifies the characteristics of the latex for impregnation purposes, but improves the quality of the rubber in the impregnated product. While I do not know precisely what reaction zinc oxide or other oxides of amphoteric metals effect upon the non-rubber constituents of rubber latex, it is quite likely that they convert the troublesome non-rubber constituents, namely, the proteins and the resins, to an insoluble, inert condition. It is quite likely that the proteins and resins in an alkali-preserved latex exist respectively as water-soluble alkali-proteinates and alkali-resinates. When the insoluble oxide of an amphoteric metal is added to an alkali-preserved latex, it is believed that the alkali serves to dissolve some of the oxide to produce a sufficiently high concentration of the ion of the amphoteric metal in solution to precipitate the insoluble proteinates and resinate of the amphoteric metal. Specifically, when the oxide of zinc is added to the alkali-preserved latex, it is quite likely that the zinc oxide reacts with the ammonia or other alkali to form a water-soluble zinc compound as follows:

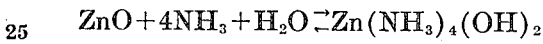

In other words, the water-insoluble zinc oxide may react with ammonia water to form the water-soluble ammonio-zinc-hydroxide, whereupon the zinc ion in solution may precipitate the insoluble zinc proteinate and zinc resinate by displacement of the alkali ion. That some chemical reaction takes place seems to be borne out by the fact that the desired modification of the characteristics of the latex is promoted by heat and agitation.

The process of the present invention may be carried out on various rubber latices in which ammonia or potassium or sodium hydroxide is used as the anti-coagulating or stabilizing agent preferably in sufficient amount to impart a strongly alkaline condition to the latices, as will presently appear. Assuming that an ammonia-preserved natural latex containing about 33% to 37% solids and having a pH value of at least, say, about 10.5 to 11.0 is used as a raw material, about 5% zinc oxide, based on the solids content of the latex, may be added to the latex. The zinc oxide may be added admixed with water as a thick paste or slurry, and the latex heated to 75° C., which temperature should be maintained for about thirty minutes to ensure complete reaction. Preferably, the zinc oxide is of fine particle size, the commercial product known as "Kadox" and having a particle size of 0.15 micron being eminently suitable because of its high reactivity.

After the heat treatment, the latex should be allowed to stand in order to permit settling out of reaction products and excess zinc oxide. When the latex used as a raw material has a bluish color, it becomes white as a result of the zinc oxide treatment, and a dark-colored sludge amounting to about 5% by volume of the total mass settles out. Evidently, the zinc oxide decolorizes the latex, the dark-colored sludge containing the colored impurities originally present in the latex. The supernatent latex may be separated from the sludge and used for impregnation purposes.

In one case, a latex treated as hereinbefore described was diluted to a solids content of about 15%. A loosely felted web composed of refined wood pulp of high alpha cellulose content was dipped into the latex and then dried, the resulting product having a fiber-rubber ratio of 1 to 1. It was found that the ply adhesion of the product was increased from 100 (in the case of untreated latex) to 350 (in the case of the treated latex), the arbitrary units given representing the resistance to the pulling apart of the two faces of the dried, rubber-impregnated web after it had been split. Doubtless this improved ply adhesion is attributable to the greater uniformity of rubber distribution through the dried product, which, in turn, is made possible by destroying the protective action of the naturally occurring protective colloids in the latex, so that the rubber particles coalesce quickly during the drying of the web and do not tend to migrate to the surface. In other words, if considerable migration to the surface of the sheet takes place during the drying operation, the center of the sheet is left relatively poorer in rubber and the sheet may easily be split apart.

While it is preferable to carry out a treatment of latex under the temperature conditions hereinbefore given, nevertheless it is possible to improve the latex under other temperature conditions. For example, when latex was treated at room temperature with 5% zinc oxide, based on the solids content of the latex, and allowed to stand for eighteen hours with occasional stirring, it was found that while the resulting latex was not conspicuously lighter in color than the original latex, nevertheless the separated sludge was darker than the zinc oxide added, showing that some decolorization of the latex had been effected. When a web similar to that described in the previous example was impregnated with the treated latex as in the previous example, the ply adhesion was about 150 to 200. These results indicate that a prolonged treatment of latex with 5% zinc oxide at room temperature, with agitation, produces results comparable to those obtained in a shorter period of time at elevated temperature.

The examples hereinbefore given are for the purpose of illustration only, as the process of the present invention may be applied when latices containing alkalies other than ammonia, such as caustic soda or caustic potash, as the stabilizing agents are used. Oxides of other amphoteric metals, such as lead, iron, and the like, may be used in lieu of zinc oxide, but I prefer to use zinc oxide because it does not produce objectionable reaction products or objectionable loading of the rubber, and it may be used even at elevated temperatures without danger of coagulating the rubber. There is little benefit gained in treating latices which have been purified in the sense that nonrubber constituents have been removed therefrom, as such purified latices do not offer the same opportunity for improvement as latices containing the non-rubber constituents naturally associated therewith.

What I claim is:

1. That step which comprises treating alkali-preserved latex of a pH value of at least about 10.5 with the oxide of an amphoteric metal in amount to effect a reaction on certain of the constituents of the latex while maintaining said latex in a substantially unthickened and unvulcanized condition and then removing such oxide and reaction products as settle in said latex.

2. That step which comprises treating alkali-preserved latex of a pH value of at least about 10.5 at elevated temperature with the oxide of an amphoteric metal in amount to effect a reaction on certain of the constituents of the latex while maintaining said latex in a substantially unthickened and unvulcanized condition and then removing such oxide and reaction products as settle in said latex.

3. That step which comprises treating alkali-preserved latex of a pH value of at least about 10.5 with zinc oxide in amount to effect a reaction on certain of the constituents of the latex while maintaining said latex in a substantially unthickened and unvulcanized condition, and then removing such oxide and reaction products as settle in said latex.

4. Steps which comprise adding zinc oxide to strongly ammoniacal ammonia-preserved latex containing the non-rubber solids naturally occurring therein but free from added accelerators of vulcanization, heating the mixture to hasten the reaction of the zinc oxide on certain of the constituents of the latex while maintaining the latex in a substantially unthickened condition, and then removing such oxide and reaction products as settle in said latex.

5. Steps which comprise adding to ammonia-preserved latex which is strongly ammoniacal about 5% zinc oxide based on the solids content of the latex to effect a reaction on certain of only the non-rubber constituents of the latex, and allowing the mixture to stand until the excess zinc oxide and the reaction products have settled out.

6. Steps which comprise adding to ammonia-preserved latex which is strongly ammoniacal about 5% zinc oxide based on the solids content of the latex to effect a reaction on certain of only the non-rubber constituents of the latex, allowing the mixture to stand until the excess zinc oxide and the reaction products have settled out, and removing the supernatant latex.

7. An unvulcanized, substantially unthickened, alkali-preserved latex, certain natural constituents of which have been reacted upon by the oxide of an amphoteric metal and have been removed from said latex.

8. An unvulcanized, substantially unthickened, ammonia-preserved latex, certain natural constituents of which have been reacted upon by zinc oxide and have been removed from said latex.

9. An unvulcanized, substantially, unthickened, alkali-preserved latex free from certain natural constituents which have been precipitated therefrom by the action of the oxide of an amphoteric metal and have been removed from said latex.

10. An unvulcanized, substantially unthickened, ammonia-preserved latex free from certain natural constituents which have been precipitated therefrom by the action of zinc oxide and have been removed from said latex.

In testimony whereof I have affixed my signature.

ROGER B. HILL.